United States Patent
Baidya et al.

(10) Patent No.: US 11,551,391 B2
(45) Date of Patent: Jan. 10, 2023

(54) DIGITAL IMAGE DYNAMIC SHADOW GENERATION

(71) Applicant: Adobe Inc., San Jose, CA (US)

(72) Inventors: Rakesh Baidya, Delhi (IN); Praveen Kumar Dhanuka, Howrah (IN); Nitin Sharma, Gurugram (IN); Arushi Jain, Ashok Vihar (IN)

(73) Assignee: Adobe Inc., San Jose, CA (US)

( * ) Notice: Subject to any disclaimer, the term of this patent is extended or adjusted under 35 U.S.C. 154(b) by 61 days.

(21) Appl. No.: 17/175,926

(22) Filed: Feb. 15, 2021

(65) Prior Publication Data

US 2022/0262052 A1    Aug. 18, 2022

(51) Int. Cl.

| G06T 11/60 | (2006.01) |
|---|---|
| G06T 11/20 | (2006.01) |
| G06F 3/0484 | (2022.01) |
| G06F 3/04845 | (2022.01) |
| G06F 3/04842 | (2022.01) |
| G06T 15/80 | (2011.01) |

(52) U.S. Cl.
CPC .......... *G06T 11/60* (2013.01); *G06F 3/04842* (2013.01); *G06F 3/04845* (2013.01); *G06T 11/203* (2013.01); *G06T 11/206* (2013.01); *G06T 15/80* (2013.01)

(58) Field of Classification Search
CPC ....... G06T 15/60; G06T 15/80; G06T 11/203; G06T 11/206; G06T 11/60; G06F 3/04842; G06F 3/04845
See application file for complete search history.

(56) References Cited

U.S. PATENT DOCUMENTS

| 9,530,243 B1* | 12/2016 | Costello | ................ G06T 15/503 |
|---|---|---|---|
| 2015/0371435 A1* | 12/2015 | Zhu | .......................... G06T 15/60 345/426 |
| 2016/0019458 A1* | 1/2016 | Kaufhold | ............ G01S 13/9027 706/20 |
| 2018/0276878 A1* | 9/2018 | Bunnell | ................ G06T 15/405 |
| 2022/0108521 A1* | 4/2022 | Sameer | ..................... G06T 7/60 |

* cited by examiner

*Primary Examiner* — Tize Ma
(74) *Attorney, Agent, or Firm* — FIG. 1 Patents

(57) ABSTRACT

Digital image dynamic shadow generation is described as implemented by a dynamic shadow system using one or more computing devices. The dynamic shadow system is configured to generate shadow objects based on one or more source objects included in a digital image (e.g., a two-dimensional digital image), automatically and without user intervention. The shadow object is based on a shape of the source object that is to "cast" the shadow and thus promotes realism. The shadow object is also generated by the dynamic shadow system to address an environment, in which, the shadow object is disposed within the digital image.

20 Claims, 16 Drawing Sheets

Algorithm 1 Shadow Creation

Require: Subject $S$
1: procedure MAPPOINT($pt, x_{frac}, y_{frac}$)
2:     $pt.x \leftarrow pt.x + x_{frac} * pt.y$
3:     $pt.y \leftarrow pt.y + y_{frac} * pt.y$
4:     return $pt$
5: procedure SHADOW CREATION($S$)
6:     $S_{merged} \leftarrow$ merged shape of $S$   ▷ $S_{merged}$ is a vector bezier spline
7:     $x_{frac} \leftarrow \frac{1}{\tan \theta_x + \tan \theta_y} - \frac{\tan \theta_z}{\tan \theta_x + \tan \theta_y}$
8:     $y_{frac} \leftarrow \frac{1}{\tan \theta_x + \tan \theta_y}$
9:     for each segment $s$ in $S_{merged}$ do
10:       $s_{p0} \leftarrow$ MAPPOINT($s_{p0}, x_{frac}, y_{frac}$)
11:       $s_{p1} \leftarrow$ MAPPOINT($s_{p1}, x_{frac}, y_{frac}$)
12:       $s_{p2} \leftarrow$ MAPPOINT($s_{p2}, x_{frac}, y_{frac}$)

```
Algorithm 2 Intersecting Shadow Creation
─────────────────────────────────────────────────────────────
Require: Subject S, Shadow D, Intersecting Object T
 1: procedure INVERSEMAPPOINT(pt, x_fov, y_fov)
 2:     pt.y ← pt.y * 1/(1+y_fov)
 3:     pt.x ← pt.x − x_fov * pt.y
 4:     return pt
 5: procedure REMAPPOINT(pt, x_fov, y_fov, T_bottom)
 6:     pt' ← INVERSEMAPPOINT(pt, x_fov, y_fov)
 7:     x ← pt'.x, y ← pt'.y
 8:     x' ← pt.x, y' ← pt.y
 9:     x'' ← intersection of line joining (x, 0) and (x', y') with T_bottom
10:     if x'' is none then            ▷ did not find any intersection with occluded objects
11:         return none
12:     y'' ← y + (x''−x)/(x'−x) * (y'−y)      ▷ This is owing to triangle proportionality theorem
13:     pt'' ← (x'', y'')
14:     return pt''
15: procedure SHADOWREMAP(D, start, end, x_fov, y_fov, T_bottom)
16:     for each segment s_i in D where i ∈ (start, end) do
17:         s_p0 ← REMAPPOINT(s_p0, x_fov, y_fov, T_bottom)
18:         s_p1 ← REMAPPOINT(s_p1, x_fov, y_fov, T_bottom)
19:         s_p2 ← REMAPPOINT(s_p2, x_fov, y_fov, T_bottom)
20: procedure SHADOWINTERSECTION(S, T, D, x_fov, y_fov)
21:     find all the intersection points of D and T
22:     Add the anchor point at all these intersection points in D
23:     for each i_th segment s_i in modified D do
24:         if s_i.p0 == T.bottom then
25:             if intersection mode then
26:                 SHADOWREMAP(D, index, i, x_fov, y_fov)
27:                 set non intersection mode
28:             else
29:                 index ← i
30:                 set intersection mode
31:     return D
─────────────────────────────────────────────────────────────
```

Fig. 11

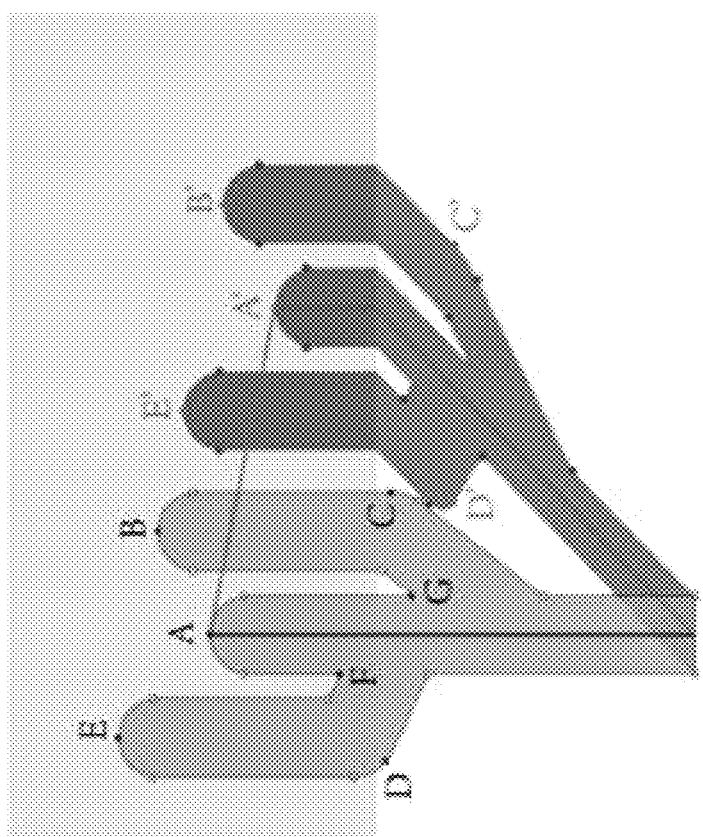
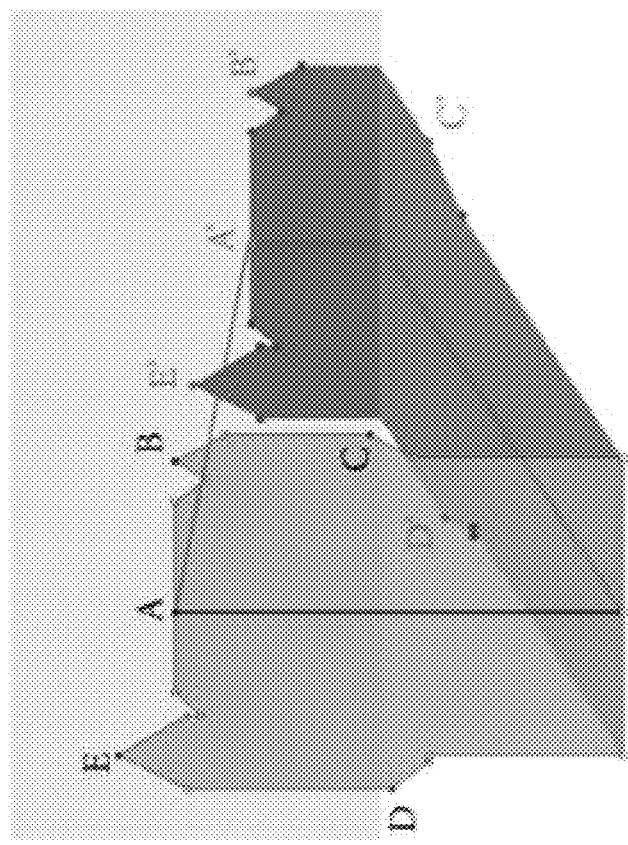
Fig. 12

1300

DIGITAL IMAGE DYNAMIC SHADOW GENERATION

BACKGROUND

Content creators, through interaction with a computing device, are provided with a variety of techniques that are usable to increase realism within two-dimensional digital images. An example of this involves shadow creation in which an object included in the digital image is provided with a shadow to invoke a feeling that the object is disposed on a ground plane (e.g., a floor, surface, and so on) within the digital image. Although conventional techniques increase the realism over that of depicting the object alone in the digital image, these conventional techniques are inflexible and fail to mimic real-world scenarios and thus differ from visual expectations of users that view these digital images.

In one such conventional example, a drop-shadow effect is supported that is used to provide a feeling of "ground" as perceived from a top view in relation to the object that "casts the shadow." However, this conventional technique fails because appearance of the shadow is predefined and independent of the object and its surrounding within the digital image, i.e., other objects. Thus, these shadows lack realism for known and relatable objects because shadows defined in this example have shapes, locations, and appearances that are divorced from an appearance of the objects that are to appear as casting the shadows. Accordingly, conventional techniques fail in such instances in promoting realism of the digital image and hinder operation of a computing device that implements these techniques resulting from additional operations and user interaction involved in correcting this failure or forgoing the feature altogether.

SUMMARY

Digital image dynamic shadow generation is described as implemented by a dynamic shadow system using one or more computing devices. The dynamic shadow system is configured to generate shadow objects based on one or more source objects included in a digital image (e.g., a two-dimensional digital image), automatically and without user intervention. The shadow object is based on a shape of the source object that is to "cast" the shadow and thus promotes realism.

The shadow object is also generated by the dynamic shadow system to address an environment, in which, the shadow object is disposed within the digital image. This includes addressing a light angle that defines an angle of light from a light source and position of the light source defined with respect to the digital image. This also includes a ground plane that is defined within the digital image, on which, the shadow depicted by the shadow object is to be cast and/or on which the source object is disposed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 6 depicts an example algorithm as implemented by a shadow generation module of FIG. 4 to generate a shadow object based on a planar object

FIG. 11 depicts an example algorithm as implemented by a shadow modification module to modify a shadow object based on shadow object intersection with a background object.

FIG. 12 depicts an example implementation of modification of a shadow object based on shadow object intersection with a background object to generate a modified shadow object.

DETAILED DESCRIPTION

Overview

Figure 1:
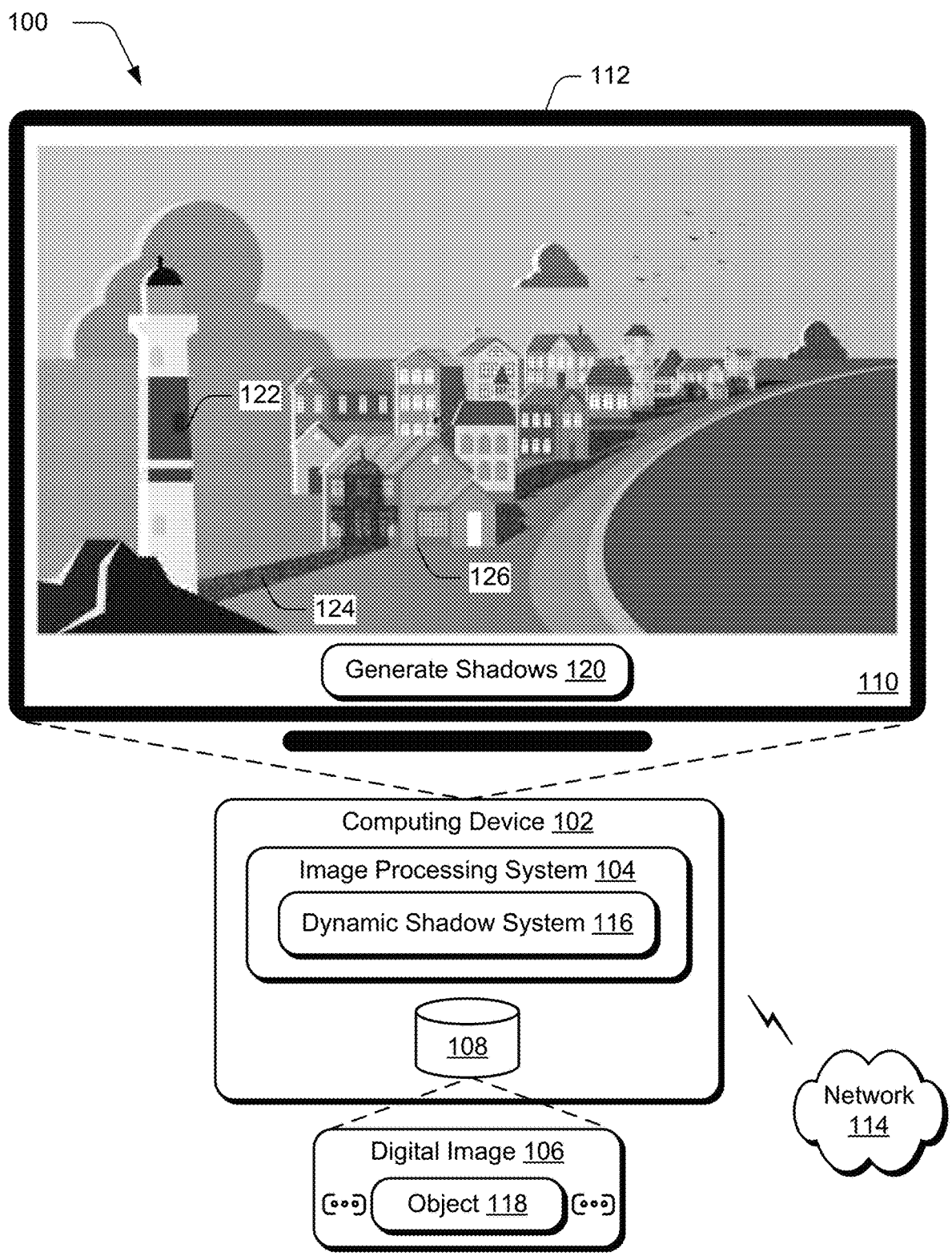
FIG. 1 is an illustration of a digital medium environment in an example implementation that is operable to employ digital image dynamic shadow generation techniques described herein.

Shadows are used in two-dimensional digital images to give an appearance of depth and promote realism of objects included in the digital images. However, techniques supported by conventional content creation systems as implemented by computing devices typically fail to achieve this goal. Oftentimes, this is because these systems generate shadows that are independent of a source object that is to "cast the shadow." Conventional techniques also fail to address the surroundings of the source object, e.g., other objects included in the digital image, an actual ground plane within the digital image, and so forth. For example, in conventional techniques a shadow was generated as having a shape that does not follow a shape of the source object, is not connected to the source object, and does not support edits. This hinders user interaction with these systems as part of creating the digital images as well as operation of computing devices that implement these techniques through increasing numbers of operations that are involved in correcting this lack of realism.

To address these challenges, digital image dynamic shadow generation is described as implemented by a dynamic shadow system using one or more computing devices. The dynamic shadow system, for instance, is configured to generate shadow objects based on one or more source objects included in a digital image (e.g., a two-dimensional digital image), automatically and without user intervention. The shadow object is based on a shape of the source object that is to "cast" the shadow and thus promotes realism.

The shadow object is also generated to address an environment, in which, the shadow object is disposed within the digital image. This includes addressing a light angle that defines an angle of light from a light source and position of the light source defined with respect to the digital image, e.g., "within" the digital image. This also includes a ground plane that is defined within the digital image, on which, the shadow depicted by the shadow object is to be cast and/or on which the source object is disposed. In one example, user inputs support positioning of the light source and thus a light angle from the light source. As a result, a length and location of shadow objects within the digital image as cast on a ground plane is user definable to change the light angle for a plurality of objects within the digital image, automatically and without further user intervention, responsive to these edits.

The dynamic shadow system is also configured to generate the shadow object to address other objects within the environment of the digital image. This include an ability to address a depth or "z-order" of the shadow object in relation to other objects, such as to appear behind other objects disposed in the digital image, even though the digital image is two dimensional. This also includes addressing an interaction of the shadow object with the other objects, such as to generate the shadow object to have a portion that intersects another object to appear as disposed on a surface of that other object.

To do so in one example, a two-dimensional digital image having a plurality of objects (e.g., vector objects, raster objects, etc.) is received and rendered in a user interface by a computing device. A user input is received to initiate shadow generation for one or more of the objects, which is referred to as a "source object." The user input, for instance, selects an option to initiate generation of shadow objects for each object included in the digital image (e.g., "Shadows On"), a selection of a particular object (e.g., a "click" using a cursor control device, gesture, or spoken utterance), and so forth.

In response, the dynamic shadow system begins by generating a planar object from the source object. The planar object defines an outer boundary of the source object. In a vector object example, this is performed by merging one or more selected vector objects (i.e., segments defined by the objects) included as part of the source object using a union operation to define the outer boundary. Other examples include border detection techniques (e.g., for raster objects) or any other technique usable to define an outer boundary of one or more objects in a digital image, including use of edge detection using machine learning, and so forth.

The planar object is then used by the dynamic shadow system to generate the shadow object. This is performable in a variety of ways by the dynamic shadow system, such as by mapping points of the planar object to a ground plane of the digital image based on a light angle of a light source within the digital image. The source object, for instance, includes an object base that defines a point of contact of the source object with a ground plane (e.g., surface, floor, etc.) in the digital image, on which, the source object is disposed. The planar object is then mapped from the object base of the source object and continues based on the light angle such that the shadow object appears disposed along and follows the ground plane. This provides an appearance of depth to the source object and helps to visually define the ground plane within the digital image, thus promoting an appearance of depth and realism.

The dynamic shadow system is also configured to modify the shadow object to address other objects that are also disposed within the digital image. The dynamic shadow system, for instance, detects a background object that is intersected by the shadow object based on association of the shadow object with the source object. As part of this, semantic filtering is employed by the dynamic shadow system. Semantic filtering includes filtering for objects in the digital image that are appropriate to include an appearance of the shadow object. Semantic filtering, for instance, is based on text associated with the object (e.g., identifies the object such as a physical object or not a physical object), appearance of the object, repetition of the object within the digital image, and so on.

Background object detection is also based on a relationship of an object base of the source object (and thus defines an origination point of the shadow object) with an object base of other objects in the digital image in relation to the light source. Objects having object bases that are closer to a light source in the digital image (e.g., along the light angle) than an object base of the source object, for instance, are not intersected by the shadow object and are thus removed from consideration as a result of the filtering, i.e., are "filtered out." On the other hand, objects having object bases that are further from a light source in the digital image than an object base of the source object have a potential for intersection and thus remain for consideration by the dynamic shadow system. This serves to improve operational efficiency of the computing device that implements the dynamic shadow system by reducing a number of objects for further processing.

Continuing with this example, the dynamic shadow system then determines from this filtered subset of objects which objects have a respective object base that is intersected by the shadow object. This serves to identify which object from the filtered subset that are too far away from the shadow object or are positioned such that an appearance of the shadow object is to continue "behind" the object. Again, this analysis, based on a relationship of the object base of the object to the shadow object, further improves operational efficiency of the computing device. A result of this processing identifies objects of the digital image that are intersected by the shadow object, referred to herein as background objects.

In instances in which a shadow object is identified by the dynamic shadow system as intersecting a background object, the dynamic shadow system determines how to modify the shadow object based this intersection. This includes generating an intersecting shadow object based on a portion of the shadow object that intersects the background object and an angle of a surface of the background object in relation to the ground plane. In an instance in which the background object depicts a building, the angle of a surface of a side of the building in relation to the ground plane defines this angle. This angle is used to remap points of the shadow object such that the portion of the shadow object appear as disposed on the side of the building. A nonintersecting shadow object is also generated having a portion of the shadow object that intersects the ground plane and thus does not intersect the background object.

The intersecting and nonintersecting portions of the background object form the modified shadow object, which is used by the dynamic shadow system to replace the shadow object within the digital image to address other objects in the digital image. As a result, the dynamic shadow system implements improved techniques that increase realism and user interaction in digital image creation and editing, further discussion of which is included in the following sections.

Term Examples

A "digital image" is any image capable of being rendered and/or stored by a computing device, e.g., as a jpeg, png, pdf, or any other computer format. An "object" is any object capable of being rendered as part of a digital image. Examples objects include vector objects, raster objects, bitmaps, and so forth.

A "ground plane" defines a surface on which objects in a digital image are depicted as disposed thereon. Examples of ground planes include surfaces, floors, and so on within digital images and as such define relative depths of objects (i.e., along "z" axis) within the digital images based on a relationship to the ground plane.

An "object base" is defined as an edge of the object that is in contact with and/or disposed adjacent to the ground plane.

A "light angle" defines an angle of light from a light source defined within the digital image with respect to the objects. A "source object" defines an object that is to serve as a basis for originating a shadow, referred to as a "shadow object." Thus, the source object "casts" the shadow object based on the light angle from the light source.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital image dynamic shadow generation techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 16.

The computing device 102 is illustrated as including an image processing system 104. The image processing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 is also implemented in whole or in part via functionality available via the network 114, such as part of a web service or "in the cloud" as further described in relation to FIG. 16.

An example of functionality incorporated by the image processing system 104 to process the digital image 106 is illustrated as a dynamic shadow system 116. The dynamic shadow system 116 is representative of functionality of the image processing system 104 to generate shadow objects based on other objects 118 included in the digital image 106. As illustrated in the user interface 110, an option 120 is displayed that is selectable to cause the dynamic shadow system 116 to generate shadow objects for corresponding source objects, automatically and without user intervention, i.e., source objects that are to "cast the shadow."

A source object 122 depicted as a lighthouse, for instance, is used as a basis by the dynamic shadow system 116 to generate a shadow object 124 having a shape based on the source object 122 and that follows a defined ground plane within the digital image 106. The dynamic shadow system 116 is further configured to modify the shadow object 124 based on its intersection with a background object 126. The dynamic shadow system 116, for instance, modifies a portion of the shadow object 124 to follow a surface of the background object 126. In this way, the dynamic shadow system 116 generates the shadow object 124 in a dynamic manner that addresses an angle of light from a light source, shape of the source object 122, angle of a ground plane, and intersection of the shadow object 124 with background object 126 in the digital image 106. Further discussion of these and other examples is included in the following sections and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein is usable in any suitable combinations and are not limited to the particular combinations represented by the enumerated examples in this description.

Dynamic Shadow Generation

Figure 2:
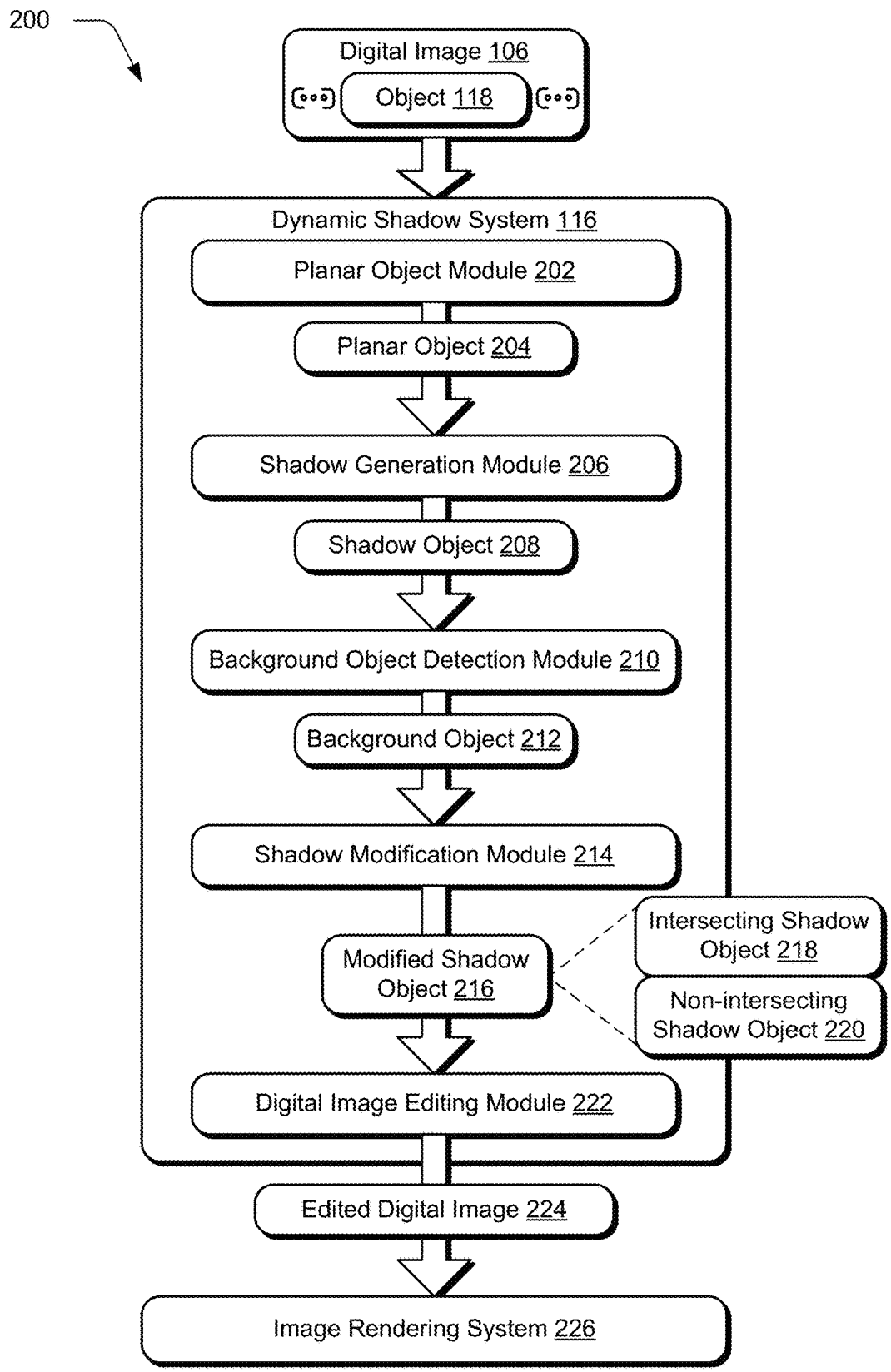
FIG. 2 depicts a system showing operation of a dynamic shadow system of FIG. 1 in greater detail.
Figure 3:
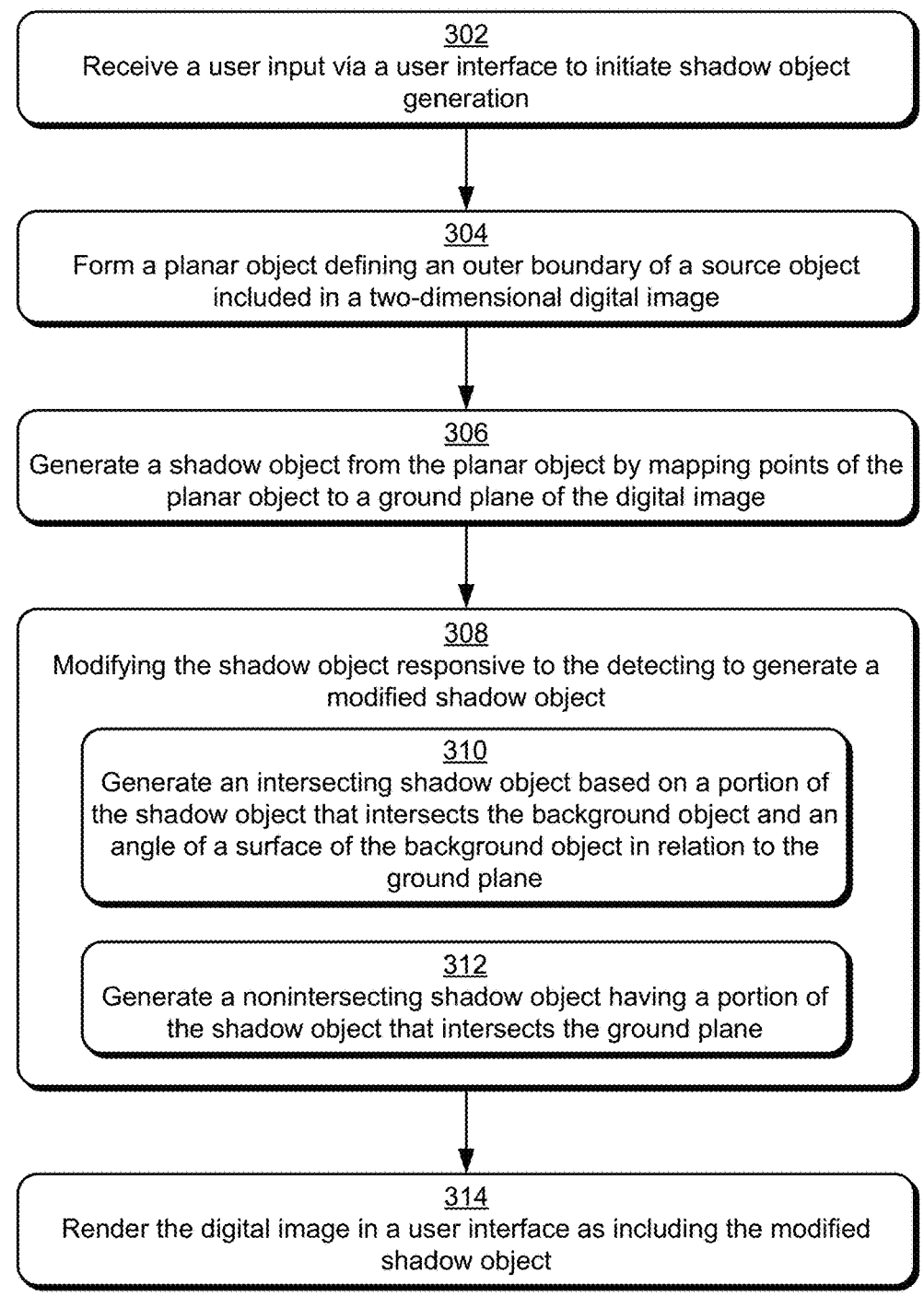
FIG. 3 is a flow diagram depicting a procedure in an example implementation in which a shadow object is generated based on a source object and modified due to intersection that is detected with respect to a background object.

FIG. 2 depicts a system 200 showing operation of the dynamic shadow system 116 of FIG. 1 in greater detail. FIG. 3 depicts a procedure 300 in an example implementation in which a shadow object is generated based on a source object and modified due to intersection that is detected with respect to a background object.

The following discussion describes techniques that are implemented utilizing the previously described systems and devices. Aspects of each of the procedures is implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-15.

In this discussion, "S" refers to a source object that is to "cast the shadow." A shadow object "D" refers to the shadow cast by the source object "S." A background object that is intersected by the shadow object "S" is also referred to as a target object "T." A light angle "$\theta_L$" is an angle of light emitted by a light source associated within the digital image 106. A floor angle "$\theta_F$" is an angle between an object base of an object and another surface (e.g., wall) defined for that object. The object base, as previously described, is an edge of the object that contacts a ground plane in the digital image 106. In an implementation, the objects 118 are configured as vector objects. The vector objects have "n" number of segments/anchors that are denoted as "p," "in," and "out" for respective Bezier splines. Therefore, there is a Bezier between every two continuous segments "i," "i+1" such that "$p_0$" and "$p_1$" of Bezier are "p" and "out" of the "$i_{th}$" segment and "$p_2$" and "$p_3$" are "in" and "p" of the "$(i+1)_{th}$" segment, respectively. Other examples of objects are also contemplated, such as bitmap objects or any other object capable of being rendered for display in a user interface 110 by a display device 112.

To begin in this example, the dynamic shadow system 116 receives a digital image 106 having a plurality of objects 118 and renders the digital image 106 in a user interface 110. A user input is received via a user interface 110 to initiate shadow object generation (block 302) by the dynamic shadow system 116. A user input as shown in FIG. 1, for instance, involves selection of an option 120 to cause generation of shadow objects for each of the objects 118 included in the digital image 106. In another example, a user input is received selecting a particular one or subset of the objects 118 that are to serve as a basis for dynamic shadow generation.

Figure 4:
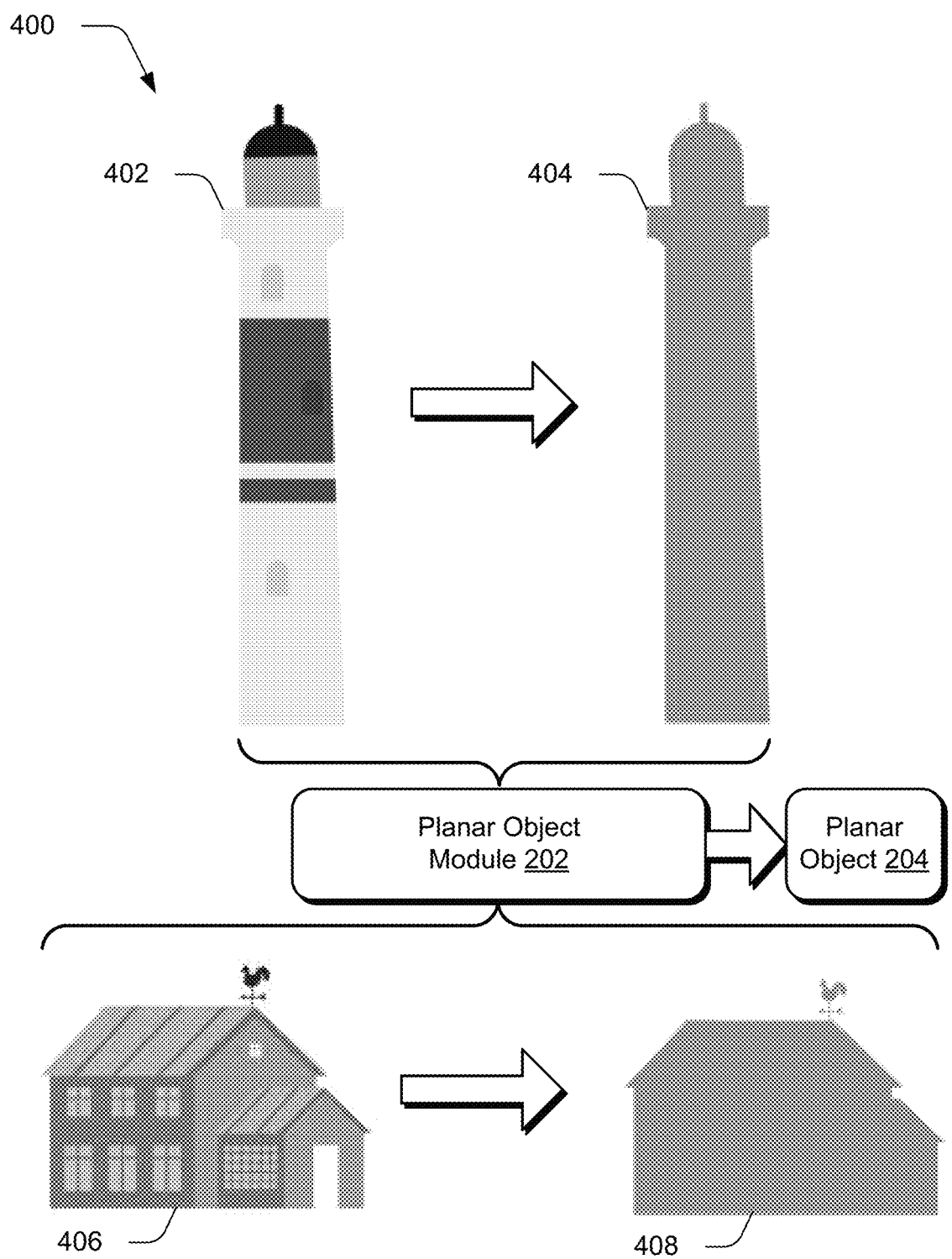
FIG. 4 depicts an example implementation of planar object generation by a planar object module of FIG. 2.

In response, a planar object module 202 forms a planar object 204 that defines an outer boundary of a source object included in a two-dimensional digital image (block 304), i.e., digital image 106. FIG. 4 depicts an example implementation 400 of planar object 204 generation by the planar object module 202 of FIG. 2.

The planar object module 202 is configured to generate the planar object 204 in a variety of ways. In an instance in which the object is a vector object, selected vector objects (if more than one) are merged using a union operation to arrive at an outer boundary. As illustrated, this acts to preserve a shape of the source object. For a lighthouse as a source object 402, for example, a corresponding planar object 404 is formed having a generally uniform fill (or no fill at all) and an outer boundary that preserves a shape of the lighthouse. Likewise, for a source object 406 as a farmhouse, this preserves the shape of the building and associated objects (e.g., the windvane) when forming the planar object 408.

Other instances are also contemplated, including edge detection techniques that employ a model trained using machine learning, and so forth. As a result, the planar object 204 acts as a starting point for dynamic shadow generation by the dynamic shadow system 116 based on a corresponding source object.

The planar object 204 is then passed from the planar object module 202 as an input to a shadow generation module 206. The shadow generation module 206 is configured to generate a shadow object 208 from the planar object 204 by mapping points of the planar object 204 to a ground plane of the digital image 106 (block 306). The shadow generation module 206 is configured to address a notion of an edge of the source object, from which, the shadow object 208 is to be created, i.e., an object base of the object, side of the object, and so on based on a relationship of the source object to the light angle from the light source. The shadow generation module 206 also addresses a light angle "$\theta_L$" which is an angle of light emitted by a light source associated within the digital image 106 and a floor angle "$\theta_F$" which is an angle between an object base of an object (e.g., defined by a ground plane) and another surface (e.g., wall) defined for that object. The light angle "$\theta_L$" is treated as the same for each part of the outer boundary in instances in which the light source is defined at a significant distance from the source object. On the other hand, the light angle "$\theta_L$" differs along respective points along the outer boundary as the light source nears the source object based on differences in respective distances between the light source and points along the outer boundary of the object.

The shadow generation module 206 is configured in this example to first generate the shadow object 208 independent of other objects 118 in the digital image 106. The shadow object 208 is then modified to address these other objects (i.e., background objects) as further described below based on background objects and detected intersections. As previously described, light angle "$\theta_L$" and floor angle "$\theta_F$" are indicative of a direction of light within the digital image 106 from a light source and an angle between an object base (i.e., an edge of the source object that contacts the ground plane in this example) and a surface of the source object, respectively.

Figure 5:
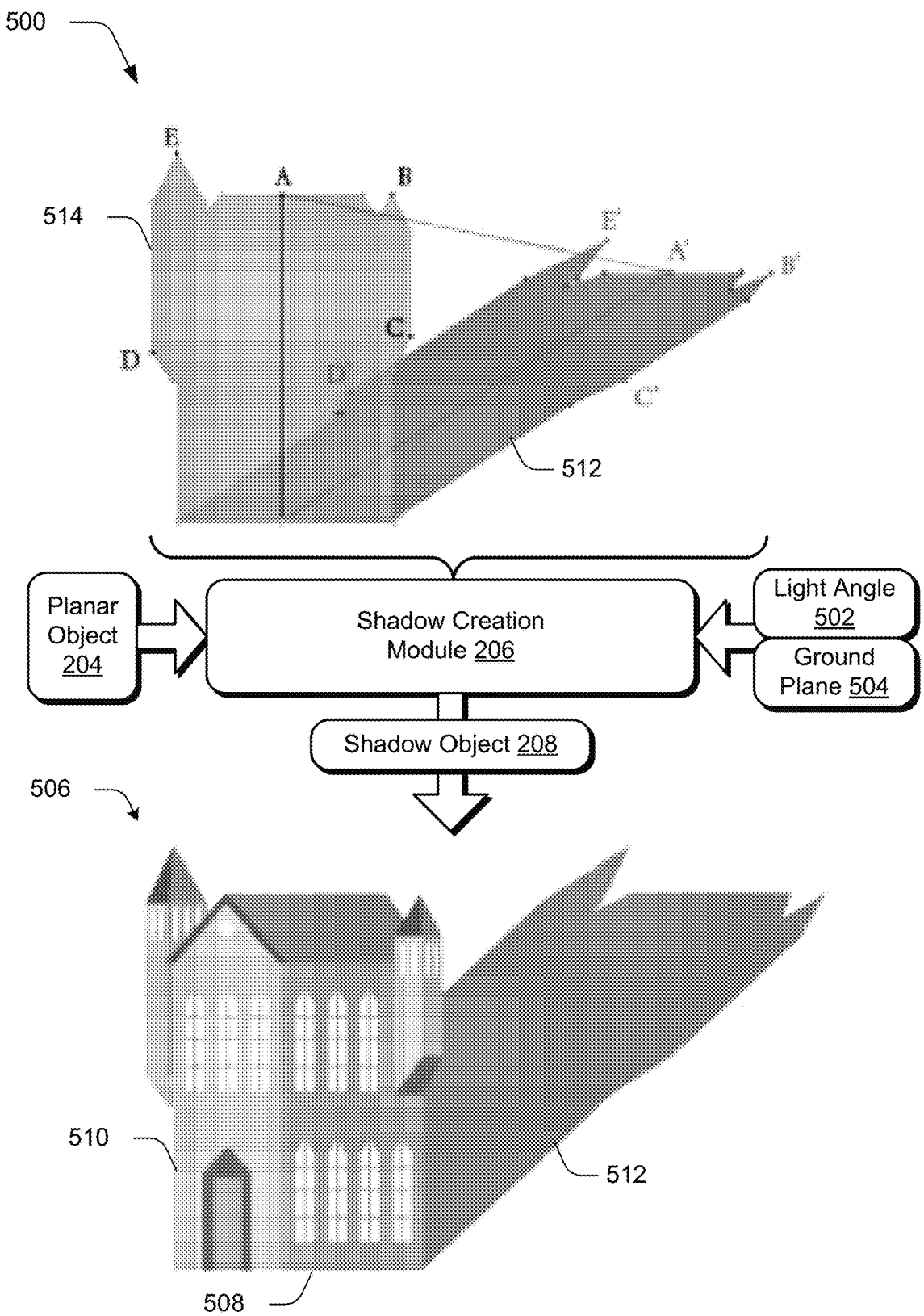
FIG. 5 depicts an example implementation showing operation of a shadow creation module of FIG. 2 in greater detail.

As depicted in an example implementation 500 of FIG. 5, the shadow generation module 206 receives as an input a light angle 502 and a ground plane 504 that are defined in relation to the digital image 106. This input is received in a variety of ways, including input manually by a user (initially or via an edit to a preexisting value), default values, detected automatically and without user intervention through image processing, and so on. In the illustrated example, the floor angle "$\theta_F$" for a source object 506 is an angle defined between an object base 508 of a building and a surface 510, which is configured as a wall of the building.

The shadow generation module 206 is configured to generate the shadow object 512 by mapping points of the planar object 514 to the ground plane 504 from the object base 508 of the source object 506 based on the light angle "$\theta_L$" 502. Thus, the light angle "$\theta_L$" 502 and ground plane 504 together define a length of the shadow object 512 as positioned relative to the object base 508 and extends "outward" based on the light angle. In an instance in which the source object 506 is a vector object, segments and control points of the merged vector object that forms the planar object 204 (which is indicative of the shadow to be "cast" by the source object) are mapped to the ground plane 504. This is illustrated in FIG. 5 through mapping of points "A," "B," "C," "D," "E," of source object 506 to corresponding points "A'," "B'," "C'," "D'," "E'," along the ground plane to form a shadow object 512.

FIG. 6 depicts an example algorithm 600 as implemented by the shadow generation module 206 to generate the shadow object 208 based on the planar object 204 when configured as a vector object. In the example algorithm 600, a source object "S" is used to form "$S_{merged}$" (e.g., as a vector Bezier spline) that denotes the planar object 204, which is a merged shape of vector objects and corresponding segments forming the source object. Fractions "frac" in "X" and "Y" directions are computed for each segment "s" of the planar object 204 to map the segments "$s_{p0}$," "$s_{p1}$," and "$s_{p2}$" to the ground plane 504 as following the light angle by the shadow generation module 206.

As a result, the shadow object 208 is generated based on a shape of a corresponding source object "S" and has a position and length defined by a light angle and ground plane associated with the digital image 106. The dynamic shadow system 116 is then configured to modify the shadow object 208 based on other objects 118 included in the digital image 106. As a result the shadow object 208 addresses an environment in which the shadow is disposed within the digital image 106 for increased realism.

The digital image 106 in some instances includes a multitude of objects 118. Accordingly, techniques are implemented by the dynamic shadow system 116 to increase processing efficiency of the computing device 102 by first employing a background object detection module 210 to detect background objects 212 that potentially intersect the shadow object 208. Objects 118 that are not intersected by the shadow object 208 are "filtered out" and not further processed, thereby saving computational resources of the computing device 102. A shadow modification module 214 is then employed to generate a modified shadow object 216 based on the intersection with the background object 212. This includes generating an intersecting shadow object 218 having a portion of the shadow object 208 that intersects the background object 212 and a nonintersecting shadow object 220 that intersects the ground plane 504 and thus does not intersect the background object 212. Background object detection may also be implemented using a neural network based technology, e.g., depth map detection from a monocular image.

Figure 7:
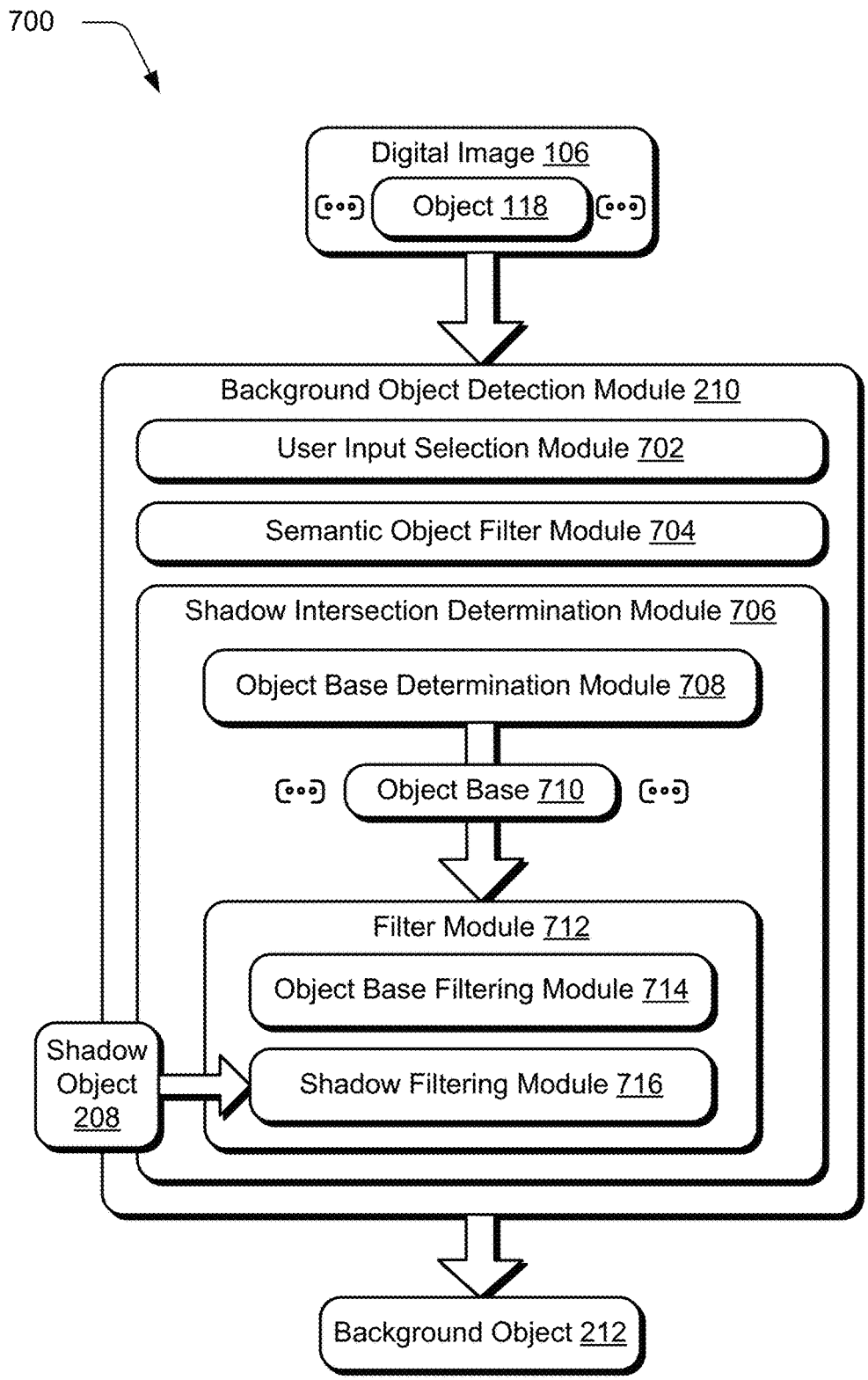
FIG. 7 depicts an example implementation showing operation of a background object detection module of FIG. 2 in greater detail as detecting shadow object intersection with background objects.

FIG. 7 depicts an example implementation 700 showing operation of the background object detection module 210 in greater detail as detecting shadow object 208 intersection with background objects 212. The background object detection module 210 is configured to determine which objects 118, if any, of the digital image 106 intersect the shadow object 208. In a first example, a user input selection module 702 is employed by the background object detection module 210 to receive a user input to select the background object 212 and/or group of background objects 212, e.g., using a cursor control device, gesture, spoken utterance, and so forth.

The background object detection module 210 also employs a variety of techniques to address the objects 118 beyond a notion of paths defined by the objects (e.g., in a vector graphic scenario) but also in terms of semantics, functionality of which is represented by a semantic object filter module 704. Examples of semantic-based techniques include natural language processing techniques leveraging text associated with the objects 118, appearance, repetition to the objects within the digital image 106, and so forth. For example, natural language processing is usable by the semantic object filter module 704 to process text associated with the objects to determine which objects are configured to support intersection with a shadow object 208 (e.g., buildings or other physical objects) and which objects are not, e.g., clouds, as typically exhibited in real world scenarios and thus improves realism in the depiction of these shadows. Similar techniques are usable by the semantic object filter module 704 based on appearance (e.g., machine-learning based object recognition techniques to distinguish between objects that are capable or not capable of having a shadow disposed thereon), repetition (e.g., based on numbers of objects to "filter out" objects that are repeated over a threshold amount), and so forth.

The background object detection module 210 also includes a shadow intersection determination module 706 that is configured to determine which objects intersect the shadow object 208. To do so, a determination is made by the shadow intersection determination module 706 based on a relationship of a respective object base of the objects 118 to (1) the object base of the source object and/or (2) the shadow object 208. In an implementation, this processing is performed in order to increase efficiency in computational resource utilization by "filtering out" objects from further processing that are not suitable for display as being intersected with a shadow object, and as such also supports improved realism.

An object base determination module 708, for instance, is configured to identify an object base 710 for each of the objects 118, e.g., after semantic filtering as described above. The object base 710 defines an edge of the respective objects 118 that is depicted as contacting the ground plane. Other examples are also contemplated, such as based on an edge of the object that is nearest a light source.

A filter module 712 is then employed by the object base determination module 708 to filter the objects based on a relationship of the object bases 710, e.g., with respect to each other and with respect to the shadow object 208. For an object base filtering module 714, this is performed based on a relationship of an object base of a source object "S" to the object bases of other objects "T" in the digital image 106. For a shadow filtering module 716, this is performed based on a relationship of the shadow object 208 to the object bases 710 of the other objects "T" in the digital image 106.

Figure 8:
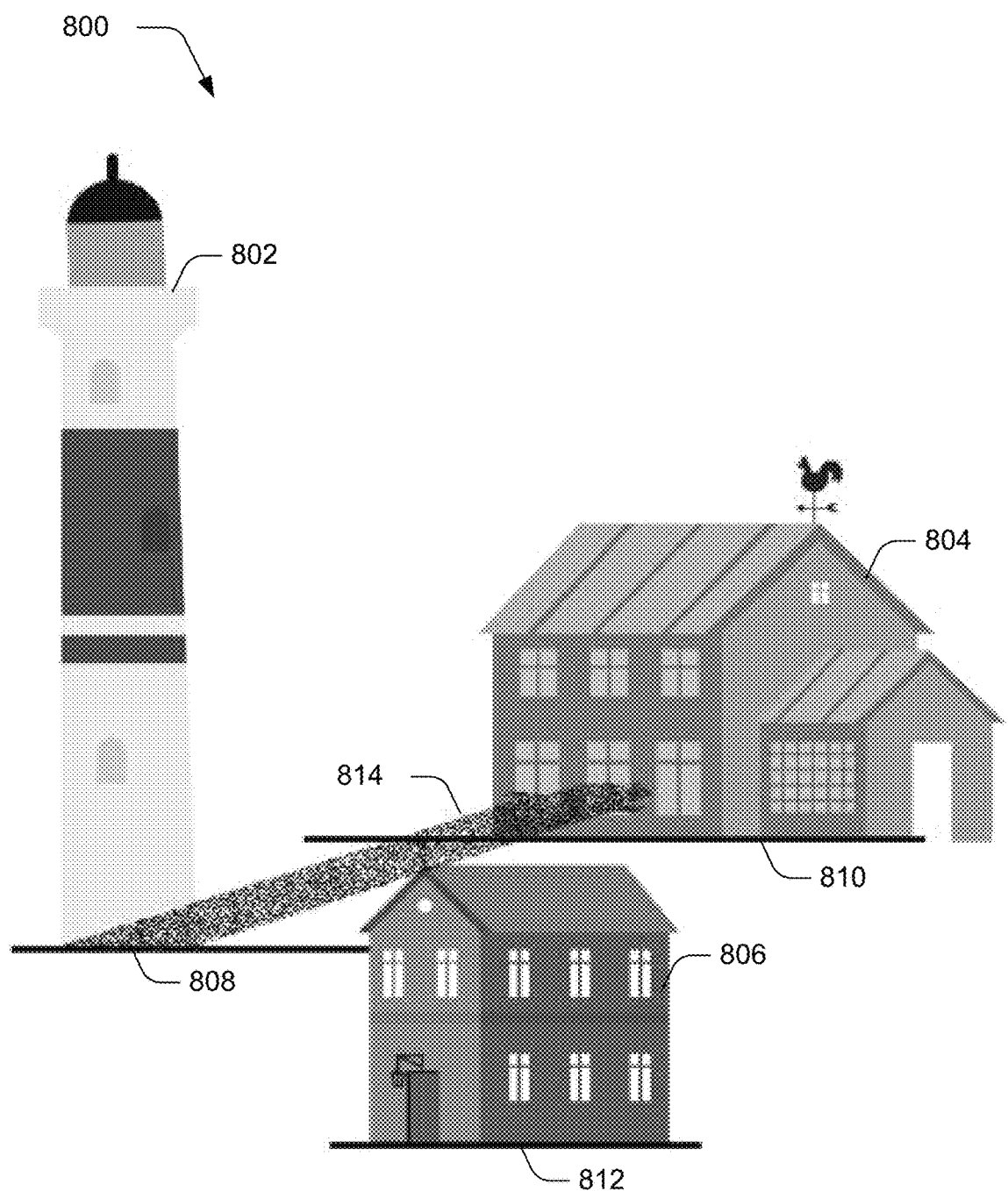
FIG. 8 depicts an example implementation of background object determination by a filter module of FIG. 7 based on respective object bases.

FIG. 8 depicts an example implementation 800 of background object determination by background object detection module 210 based on respective object bases. In this figure, a source object 802 is depicted as a light house along with first and second target objects 804, 806. The source object 802 and the first and second target object 804, 806 are illustrated as including respective object bases 808, 810, 812 for purposes of discussion.

The object base filtering module 714 is configured to determine a relationship of the object bases 810, 812 of the first and second target objects 804, 806 with respect to the object base 808 of the source object 802. This is used to determine depths of the objects in relation to each other and/or in relation to a light source defined for the digital image 106. In the illustrated example, the second target object 806 is located closer (depth wise) in the digital image 106 (e.g., based on distance from a base/bottom of the digital image 106) which is detected from a comparison of respective object bases 808, 812. Object base 812, for instance, is "lower" in the digital image 106 and thus also closer to a light source and at a lesser depth in this example than the source object 802. Thus, the first target object 806 is not to be considered for further processing, e.g., to determine intersection with the shadow object 208 and improves processing efficiency of the computing device 102. This is because the source object 802, and thus its corresponding shadow, lies "behind" the second target object 806 and thus intersection of the shadow object with the first target object 806 is not visually realistic.

On the other hand, the first target object 804 is disposed "behind" the source object 802 based on a comparison of respective object bases 808, 810 as described above. Thus, it is possible in this example for the shadow object 814 to intersect the first target object 804. Consequently, the object base filtering module 714 performs further processing through use of the shadow filtering module 716. The shadow filtering module 716 is configured to determine whether a shadow object 814 of the source object 802 intersects the object base 810 of the first target object 804, e.g., through comparison of coordinates of a defined shape of the shadow object 814 with coordinates of the respective object base 810. As illustrated for the first target object 804 in FIG. 8, the shadow object 814 does indeed intersect the object base 810 and thus the first target object 804. As a result, the first target object 804 is indicated as a background object 212 for use in modifying the shadow object 208 as further described below.

Figure 9:
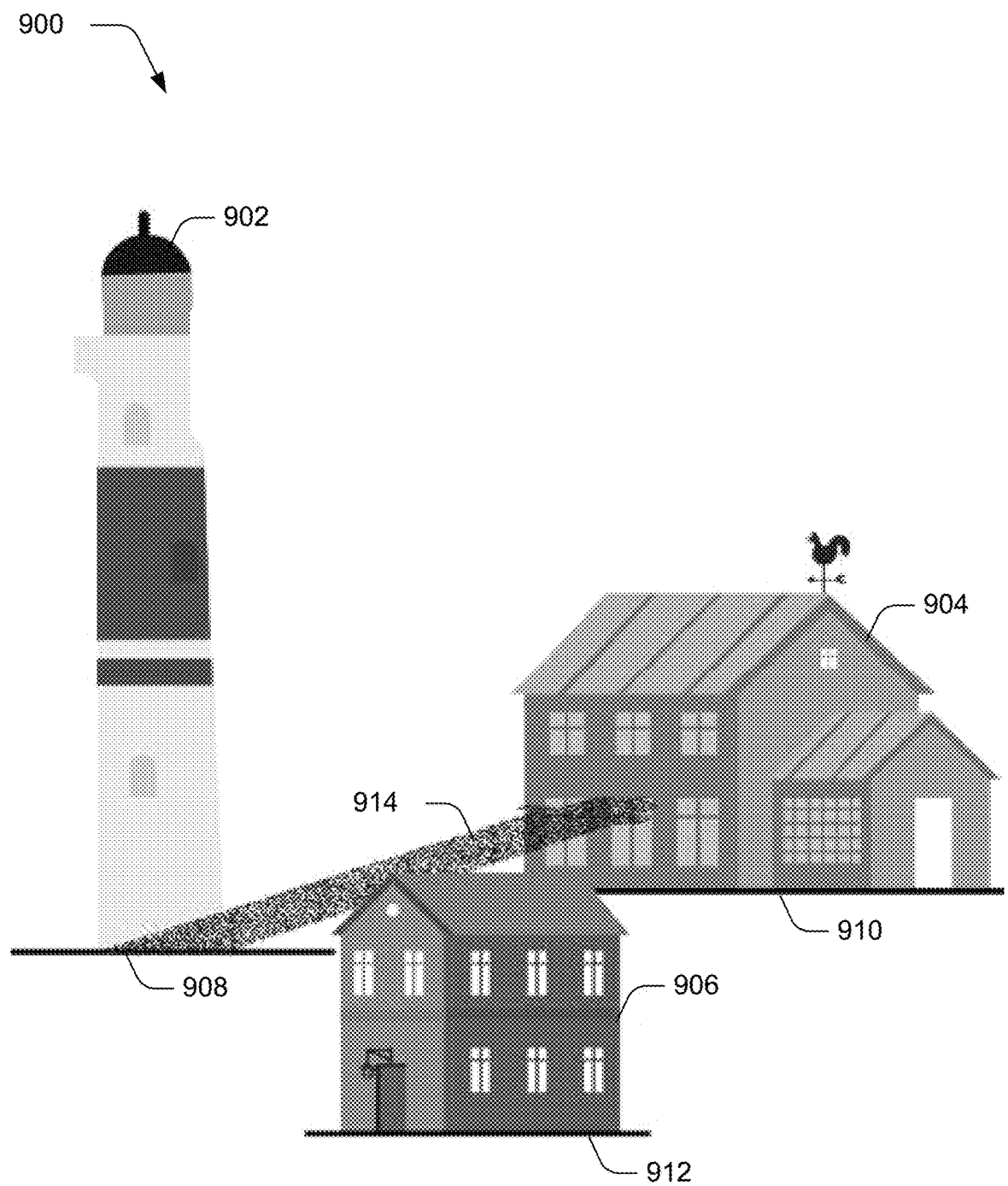
FIG. 9 depicts another example implementation of background object determination by a filter module of FIG. 7 based on respective object bases.

FIG. 9 depicts another example implementation 900 of background object determination by the background object detection module 210 based on respective object bases. Like FIG. 8, a source object 902 is depicted as a light house and included along with first and second target objects 904, 906 in a digital image 106. The source object 902 and the first and second target objects 904, 906 include respective object bases 908, 910, 912.

As before, the object base filtering module 714 determines a relationship of the object bases 910, 912 of the first and second target objects 904, 906 to the object base 908 of the source object 902. Based on this, the second target object 906 is again filtered from further processing by the shadow filtering module 716 as described above. The first target object 904, on the other hand, is disposed "behind" the source object 902 and "away" from the light source based on relative positioning of the object bases and light angle from a light source. Although depth and relative order are defined in this example from a "bottom" of the digital image 106, other examples are also contemplated.

As before, objects that are not "filtered out" by the object base filtering module 714 are further processed through use of the shadow filtering module 716. The shadow filtering module 716 is configured to determine whether a shadow object 914 cast by the source object 902 intersects the object base 910 of the first target object 904. In FIG. 9, this intersection does not occur and thus the shadow object 914 passes "behind" the first target object 904. As a result, neither the first target object 904 nor the second target object 906 are indicated as background objects 212 for use in modifying the shadow object 208.

The background object 212, when detected as described in relation to FIG. 8, is passed from the background object detection module 210 as an input to the shadow modification module 214. The shadow modification module 214 is configured to modify the shadow object 208 to generate a modified shadow object 216 responsive to the detecting of the background objects 212 (block 308), automatically and without user intervention.

Figure 10:
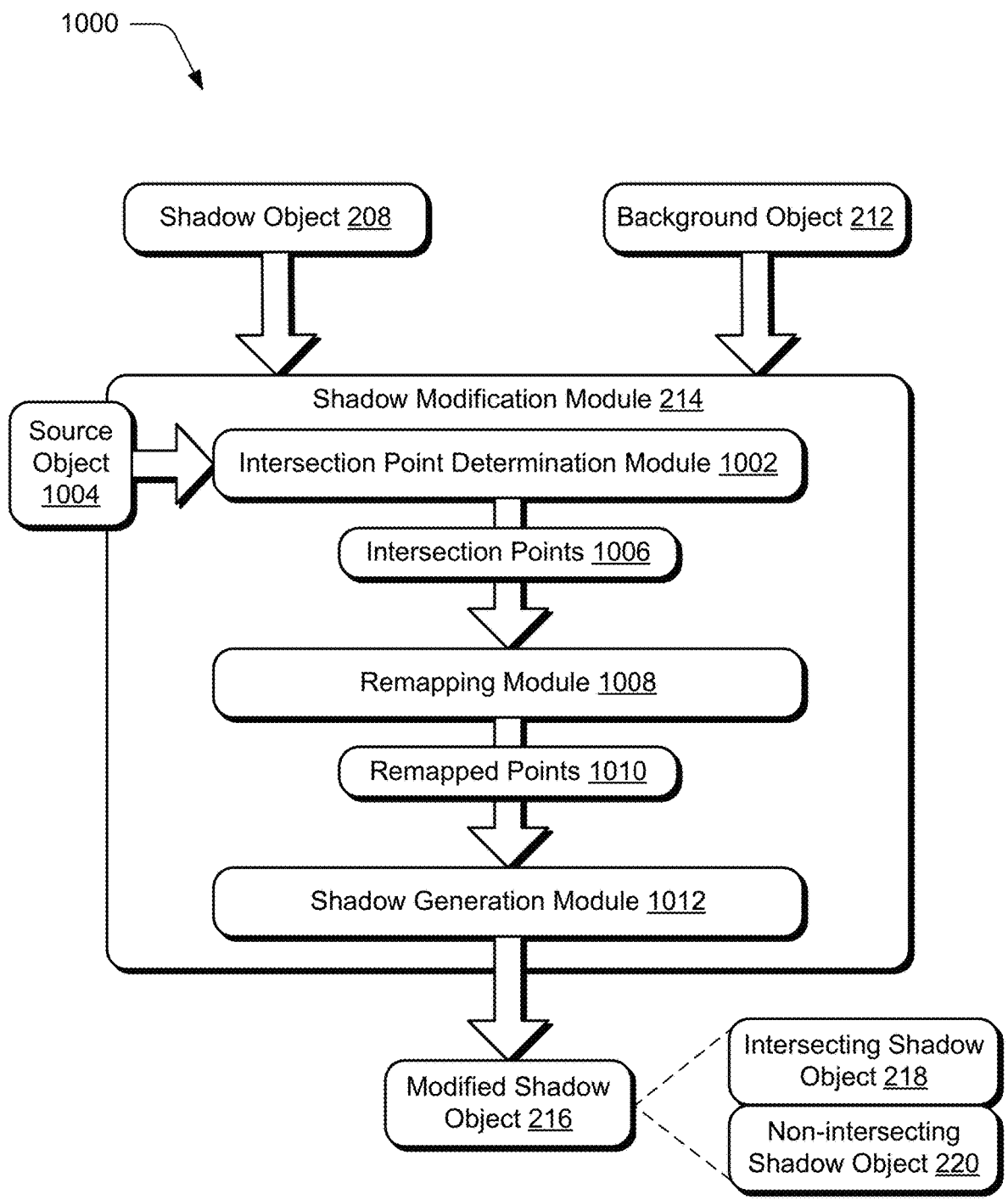
FIG. 10 is an illustration of an example implementation showing operation of a shadow modification module of FIG. 2 in greater detail.

FIG. 10 is an illustration of an example implementation 1000 showing operation of the shadow modification module 214 in greater detail. The shadow modification module 214 is configured to generate, based on a source object 1004, the shadow object 208 and the background object 212, a modified shadow object 216 having an intersecting shadow object 218 and a nonintersecting shadow object 220. The intersecting shadow object 218 is generated by the shadow modification module 214 based on a portion of the shadow object 208 that intersects the background object 212 and an angle of a surface of the background object 212 in relation to the ground plane (block 310), i.e., floor angle "$\theta_F$". The nonintersecting shadow object 220, on the other hand, is generated by the shadow modification module 214 as having a portion of the shadow object 208 that intersects the ground plane (block 312) and not the background object 212. In this way, the shadow modification module 214 modifies the shadow object 208 into multiple objects that together support an updated shadow definition of a portion of the shadow object 208 that intersects the background object 212.

Figure 13:
FIG. 13 depicts an example algorithm as implemented by a shadow modification module to modify a shadow object based on partial shadow object intersection with a background object.
Figure 14:
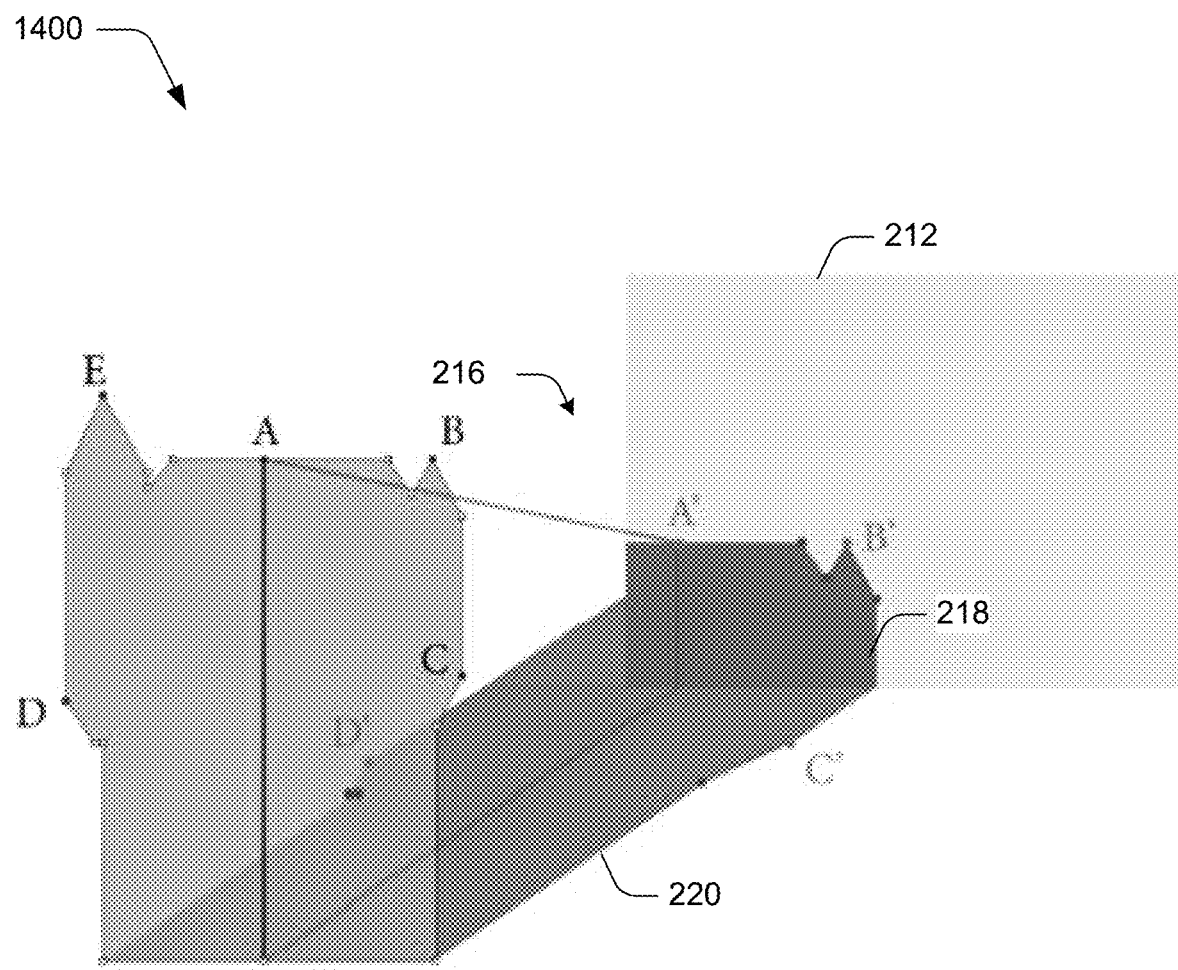
FIG. 14 depicts an example implementation of modification of a shadow object based on partial shadow object intersection with a background object to generate a modified shadow object.

To do so, an intersection point determination module 1002 is configured to determine which points of the shadow object 208 intersect the background object 212, which are referred to as intersection points 1006. The intersection points 1006 are then remapped by a remapping module 1008 to generate remapped points 1010, e.g., based on a floor angle "$\theta_F$" of a surface of the background object 212 on which the portion of the shadow object 208 is to be disposed. A shadow generation module 1012 is then employed to generate the modified shadow object 216 as including an intersecting shadow object 218 based on the remapped points 1010 and a nonintersecting shadow object 220 based on points of the shadow object 208 that intersect a ground plane and thus do not intersect the background object 212. In FIGS. 11 and 12, this is performed by the shadow modification module 214 for a complete intersection of an axis of the shadow object 208 with the background object 212. In FIGS. 13 and 14 this is performed by the shadow modification module 214 for a partial intersection of an axis of the shadow object 208 with the background object 212 such that at least a portion of the shadow object 208 continues "behind" the background object 212.

FIG. 11 depicts an example algorithm 1100 as implemented by the shadow modification module 214 for shadow object 208 modification in which the shadow object 208 does not extend past the background object 212. In this example, a single background object 212 is described, however this technique is equally applicable to multiple background objects. The shadow modification module 214 begins by detecting intersection points of the shadow object 208 with the background object 212. Additional anchor points are also defined along an edge of intersection of the shadow object 208 with the background object 212. This identifies a portion of the shadow object 208 that intersects the background object 212 and separates this portion from another portion that does not intersect the background object 212.

From this, the shadow modification module 214 remaps points of the intersecting portion to follow a surface of the background object 212 and more particularly a floor angle "$\theta_F$" of a surface of the background object 212. In the example implementation 1200 of FIG. 12, the surface of the background object 212 is parallel to a surface of the source object although other examples are also contemplated. The remapped points thus form the intersecting shadow object 218. Points that are not intersecting are used to form the nonintersecting shadow object 220 by the shadow modification module 214 as further described below.

Thus, in the example algorithm 1100, inverse map points are first computed for anchor points in the background object 212 "T," e.g., so for each "A"' a corresponding point "A"' is determined. A triangle proportionality theorem is then employed to remap those points that are intersecting. Shadow remapping is employed that includes insertion of additional anchor points at shadow object/background object intersections. In a vector object scenario, Bezier control points are then generated to define the intersecting shadow object 218. This is also performed to define the nonintersecting shadow object 220.

FIG. 13 depicts an example algorithm 1300 as implemented by the shadow modification module 214 for shadow object 208 modification in which the shadow object 208 extends past the background object 212, which is referred to as partial intersection. In this algorithm, again in a vector object example, the shadow modification module 214 tests each Bezier "$b_i$" connecting segments "$s_i$" and "$s_{i+1}$" of the shadow object 208 for intersection with the background object 212. This is performed by checking extreme end points of the closed bounds of Bezier "$b_i$" and validate if it has partial intersection.

In a scenario in which partial intersection is detected, Bezier "$b_i$" is split into portions (e.g., equal parts, based on a parametric value, and so on) and the shadow modification module 214 repeats the process. To check if any anchor point of the shadow object 208 intersects the background object 212, the shadow modification module 214 validates if the point has any valid remapped points 1010 as described in relation to the example algorithm 1100. As shown in an example implementation 1400 of FIG. 14, the modified shadow object 216 includes an intersecting shadow object 218. The modified shadow object 216 also includes a nonintersecting shadow object 220 that extends behind the background object 212.

Figure 15:
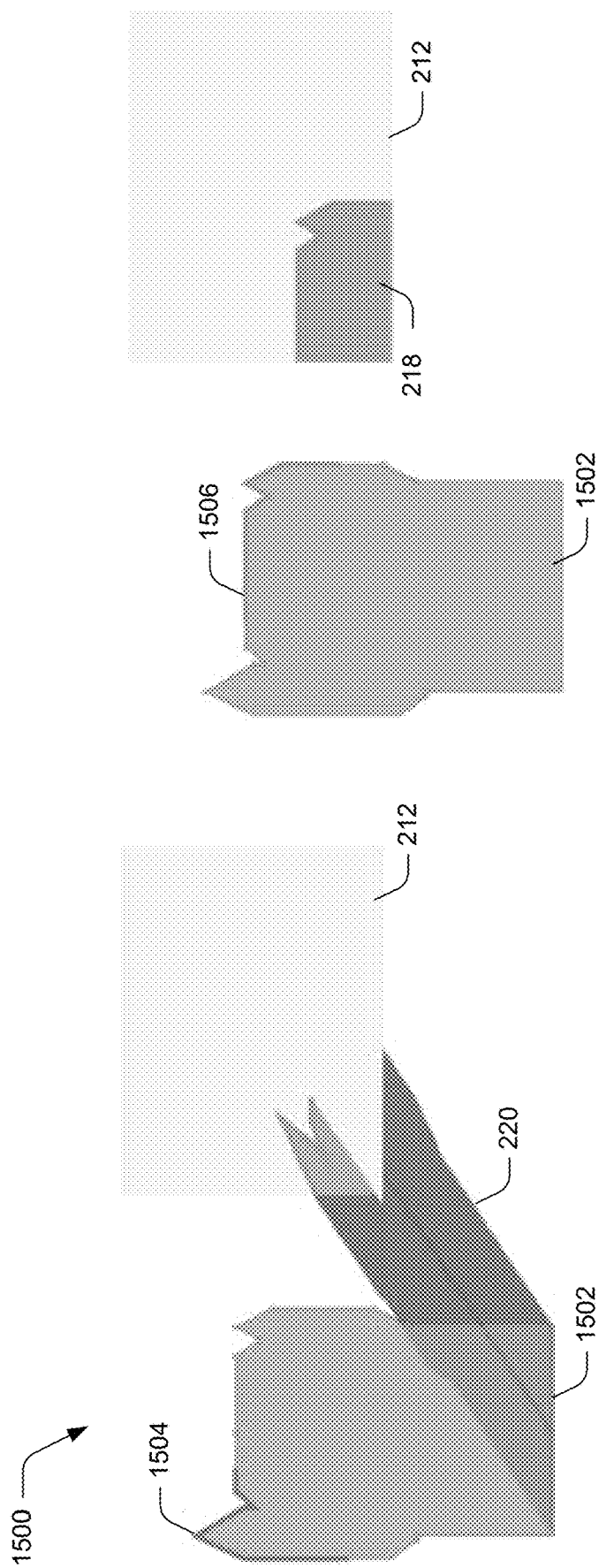
FIG. 15 depicts an example implementation of modification of a shadow object thereby forming a modified shadow object including an intersecting shadow object and a non-intersecting shadow object.

FIG. 15 depicts an example implementation 1500 of modification of the shadow object 208 as forming modified shadow object 216 that includes an intersecting shadow object 218 and a nonintersecting shadow object 220. Once intersection points are detected as described in relation to FIGS. 10 and 12 by the shadow modification module 214, segments are added to the shadow object 208. To do so, segments are remapped between every consecutive pair of intersection points as following an odd/even rule policy to split the shadow object 208 into the modified shadow object 216 including the intersecting shadow object 218 and the nonintersecting shadow object 220. Portions of the nonintersecting shadow object 220 have a "Z" order below the subject object 1502 and the background object 212. Thus, points along segment 1504 are not mapped to the background object 212. On the other hand, in order to form the intersecting shadow object 218 points along segment 1506 are mapped to a surface of the background object 212.

Thus, in this example segments between intersecting pairs of points form portions of the modified shadow object 216 where the end intersecting points are joined by occluded object partial segments in between. The nonintersecting shadow object 220 has segments in between the consecutive intersecting points removed from the shadow object 208, and like the intersecting shadow object 218, includes intermediate segments from the background object 212. Therefore, in an example the control points of the background object "T" are inversed mapped into the shadow space and referred to as "T'." A value "I'" represents an intersection of "T'" and "D." "D'" is a mapped point of "I'." The intersection "I" is then computed by subtracting the inversed mapped background object "T'" from the shadow object 218 "D," i.e., "I"=D-T'." The intersecting shadow object 218 is therefore "D=I"." This functions also in scenarios where there is not any intersection of the boundary but where background object is totally contained inside shadow object "D." "D" will be above the hierarchy as compared to background object "T," while "D''" is lower in the hierarchy.

Although intersection with a single surface of the background object is described, depth estimation may also be employed to further refine the surface, e.g., to compose multiple surfaces having different defined depths and have the shadow object follow these surfaces.

An edited digital image 224 formed by the digital image editing module 222 to include the modified shadow object 216 is then rendered by an image rendering system 226 in the user interface 100 as including the modified shadow object 216 (block 314). In an implementation, this includes display of the modified shadow object 216 as having a patterned or gradient fill (e.g., as following depth and/or a light angle within the digital image) to promote further realism. For example, the nonintersecting shadow object 220 includes a gradient fill that lessens as following the ground plane whereas the intersecting shadow object 218 includes a uniform fill, and thus differs from the nonintersecting shadow object 220. In this way, the dynamic shadow system 116 promotes dynamic shadow generation for digital images that improve operational efficiency of a computing device and user interaction with the system.

Example System and Device

Figure 16:
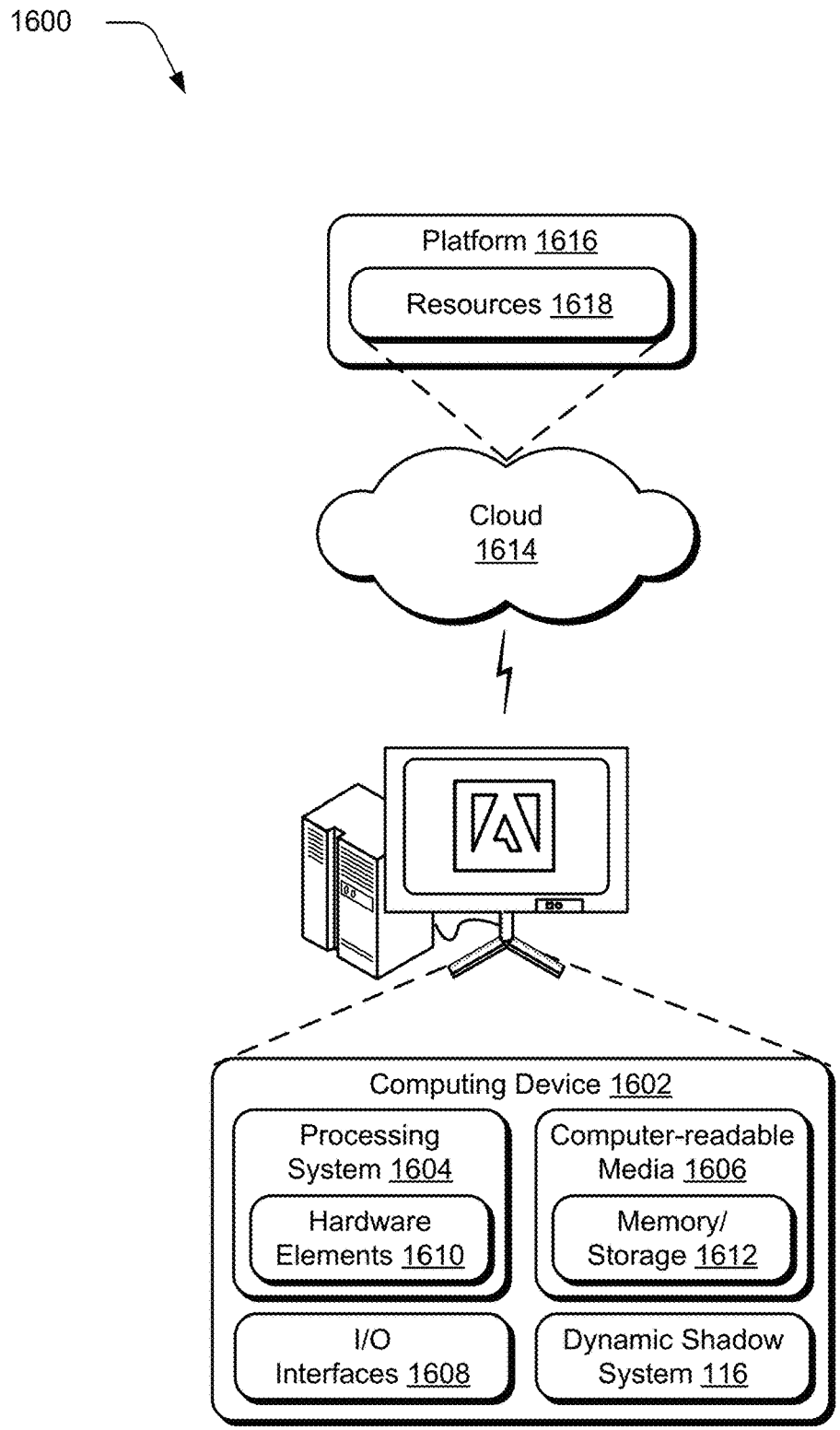
FIG. 16 illustrates an example system including various components of an example device that can be implemented as any type of computing device as described and/or utilize with reference to FIGS. 1-15 to implement embodiments of the techniques described herein.

FIG. 16 illustrates an example system generally at 1600 that includes an example computing device 1602 that is representative of one or more computing systems and/or devices that may implement the various techniques described herein. This is illustrated through inclusion of the dynamic shadow system 116. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage 1612 may include volatile media (such as random access memory (RAM)) and/or nonvolatile media (such as read only memory (ROM), Flash memory, optical disks, magnetic disks, and so forth). The memory/storage 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources and functions to connect the computing device 1602 with other computing devices. The platform 1616 may also serve to abstract scaling of resources to provide a corresponding level of scale to encountered demand for the resources 1618 that are implemented via the platform 1616. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium shadow generation environment for a digital image, a method implemented by a computing device, the method comprising:
    forming, by the computing device, a planar object defining an outer boundary of a source object included in a two-dimensional digital image;
    generating, by the computing device, a shadow object from the planar object by mapping points of the planar object to a ground plane of the digital image;
    detecting, by the computing device, a background object in the digital image is at least partially intersected by the shadow object;
    modifying, by the computing device, the shadow object responsive to the detecting by generating:
        an intersecting shadow object based on a portion of the shadow object that intersects the background object and an angle of a surface of the background object in relation to the ground plane; and
        a nonintersecting shadow object having a portion of the shadow object that intersects the ground plane; and
    rendering, by the computing device, the digital image in a user interface as including the modified shadow object.

2. The method as described in claim 1, wherein the source object, the shadow object, and the modified shadow object are vector objects defined using Bezier segments.

3. The method as described in claim 1, wherein the forming of the planar object includes merging one or more selected vector objects included as part of the source object using a union operation to define the outer boundary.

4. The method as described in claim 1, wherein the detecting the background object includes receiving a user input via a user interface as selecting the background object.

5. The method as described in claim 1, wherein the detecting the background object includes filtering a plurality of objects in the digital image using semantic techniques.

6. The method as described in claim 5, wherein the semantic techniques are based on text associated with respective said object, appearance, or repetition of the plurality of objects.

7. The method as described in claim 1, wherein the detecting the background object is at least partially intersected by the shadow object is based on a relationship of an object base of the source object defined in relation to the ground plane to an object base of the background object defined in relation to the ground plane.

8. The method as described in claim 1, wherein the detecting the background object is at least partially intersected by the shadow object is based at least in part on a determination of whether the shadow object intersects an object base of the background object defined in relation to the ground plane.

9. The method as described in claim 1, wherein the generating the intersecting shadow object includes mapping points included in the portion of the shadow object to an edge of the background object.

10. The method as described in claim 1, wherein the modifying of the shadow object includes applying a patterned fill or gradient fill within an outer boundary defined by the modified shadow object as including the intersecting shadow object and the nonintersecting shadow object.

11. The method as described in claim 10, wherein the patterned fill or gradient fill applied within the intersecting shadow object is different than the patterned fill or gradient fill applied within the nonintersecting shadow object.

12. The method as described in claim 1, further comprising receiving a user input via a user interface to initiate shadow object generation and the forming, the generating, the detecting, the modifying, and the rendering is performed by the computing device automatically and without user intervention responsive to the user input.

13. In a digital medium shadow generation environment, a system comprising:
    a shadow generation module implemented at least partially in hardware of a computing device to generate a shadow vector object from a planar vector object, the planar vector object defining an outer boundary of a source vector object by mapping points of the planar vector object to a ground plane of a digital image;
    a background object detection module implemented at least partially in hardware of the computing device to detect a background vector object in the digital image is at least partially intersected by the shadow vector object;
    a shadow modification module implemented at least partially in hardware of the computing device to modify the shadow vector object by generating an intersecting shadow vector object based on a portion of the shadow vector object that intersects the background object and an angle of a surface of the background vector object in relation to the ground plane; and
    a digital image editing module implemented at least partially in hardware of the computing device to edit the digital image as including the modified shadow vector object.

14. The system as described in claim 13, wherein the shadow modification module is further configured to generate a nonintersecting shadow vector object having a portion of the shadow object that intersects the ground plane.

15. The system as described in claim 13, further comprising a planar object module configured to generate the planar vector object by merging one or more selected vector objects included as part of the source vector object using a union operation to define the outer boundary.

16. The system as described in claim 13, wherein the background object detection module is configured to detect the background vector object based on a relationship of an object base of the source vector object defined in relation to the ground plane to an object base of the background vector object defined in relation to the ground plane.

17. The system as described in claim 13, wherein the background object detection module is configured to detect the background vector object is at least partially intersected by the shadow vector object based at least in part on a determination of whether the shadow vector object intersects an object base of the background vector object defined in relation to the ground plane.

18. In a digital medium shadow generation environment for a digital image, a system comprising:
- means for detecting a background vector object in the digital image is at least partially intersected by the shadow vector object associated with a source vector object and a light angle describing an angle of light from a light source associated within the digital image;
- means for modifying the shadow vector object including:
  - means for generating an intersecting shadow vector object based on a portion of the shadow vector object that intersects the background vector object and an angle of a surface of the background vector object, on which, the portion of the shadow vector object is disposed, in relation to a ground plane, on which, the background vector object is disposed; and
  - a nonintersecting shadow vector object having a portion of the shadow object that intersects the ground plane; and
- means for rendering the digital image in a user interface as including the modified shadow vector object.

19. The system as described in claim 18, further comprising means for forming a planar vector object defining an outer boundary of the source vector object.

20. The system as described in claim 19, further comprising means for generating the shadow vector object from the planar vector object by mapping points of the planar vector object to the ground plane.

* * * * *